US009223887B2

(12) United States Patent
Wang

(10) Patent No.: US 9,223,887 B2
(45) Date of Patent: *Dec. 29, 2015

(54) SELF-ORGANIZING COMMUNITY SYSTEM

(76) Inventor: Lixiong Wang, Beijing (CN)

(*) Notice: Subject to any disclaimer, the term of this patent is extended or adjusted under 35 U.S.C. 154(b) by 329 days.

This patent is subject to a terminal disclaimer.

(21) Appl. No.: 13/212,947

(22) Filed: Aug. 18, 2011

(65) Prior Publication Data

US 2012/0072496 A1 Mar. 22, 2012

Related U.S. Application Data

(60) Provisional application No. 61/375,021, filed on Aug. 18, 2010.

(51) Int. Cl.
*G06F 15/16* (2006.01)
*G06F 17/30* (2006.01)

(52) U.S. Cl.
CPC ...... *G06F 17/3089* (2013.01); *G06F 17/30592* (2013.01); *G06F 17/30595* (2013.01); *G06F 17/30864* (2013.01); *G06F 17/30882* (2013.01)

(58) Field of Classification Search
CPC ..................................................... G06F 15/16
USPC ............................. 709/206, 204, 205; 705/9
See application file for complete search history.

(56) References Cited

U.S. PATENT DOCUMENTS

| 6,112,188 | A | * | 8/2000 | Hartnett | 705/36 R |
|---|---|---|---|---|---|
| 7,774,388 | B1 | * | 8/2010 | Runchey | 707/811 |
| 2002/0046273 | A1 | * | 4/2002 | Lahr et al. | 709/224 |
| 2005/0021479 | A1 | * | 1/2005 | Jorba et al. | 705/67 |
| 2008/0243933 | A1 | * | 10/2008 | Holtzman et al. | 707/104.1 |
| 2009/0083390 | A1 | * | 3/2009 | Abu-Ghazaleh et al. | 709/209 |
| 2010/0063903 | A1 | * | 3/2010 | Whipple et al. | 705/30 |
| 2010/0198648 | A1 | * | 8/2010 | Bank et al. | 705/9 |

* cited by examiner

*Primary Examiner* — Emmanuel L Moise
*Assistant Examiner* — Marie Georges Henry
(74) *Attorney, Agent, or Firm* — Erickson Law Group, PC

(57) ABSTRACT

The invention provides self-organization methodologies and system for internet users to build web-based organizational hierarchical structure that is constituent of units within which direct and sufficient communication can be fulfilled. Each unit is administrated autonomously through the democratic-decision process, and processes information internally. The members of unit can designate or replace its leader anytime though election; the leader elect of a unit will then become a member of its direct upper unit in the structure, representing its unit to participate in the management and election of upper unit and to bring the consolidated results of its unit to the upper unit for further consolidation; recursively, a hierarchical structure is to form from bottom to upper progressively, and to produce different level of end products at different layer. Taking the advantage of self-organization methodologies, the SOC & SOwiki platform and systems are to be designed and implemented to support various applications of SOC & SOwiki structures that are created to satisfy different social needs or business models.

15 Claims, 7 Drawing Sheets

SELF-ORGANIZING COMMUNITY SYSTEM

This application claims the benefit of U.S. Provisional Patent Application, Ser. No. 61/375,021, filed on Aug. 18, 2010

FIELD OF THE INVENTION

This invention relates in general to web application, more specifically to methods and systems for effective collaboration and collective actions of web users, which can be used to build various functions and operation models.

BACKGROUND OF THE INVENTION

With the advent of Web 2.0, the way of information distribution and communication by evolving from "read-only" to "participation from virtually all the users" has inevitably led to information overload. Without effective filtering, verifying, refining and consolidation, useful contents is buried among an enormous amount of useless information, hence serves no use. The present inventor recognizes the questions of how to solve information overload, to consolidate information, and to take advantage of the information has become a major pressing issue of the Internet evolution.

SUMMARY OF THE INVENTION

A method and system comprising or creating a self-governing structure for completing a project is disclosed. In some applications, the project comprises organizing and filtering information. In one embodiment, a Self-Organizing Community (SOC) method and system is provided.

SOC can be applied to build self-organization structure from nonexistence which grows as viral expansion loop and has the mechanism of self-consolidation. As an entity, SOC is a hierarchical, multi-layer organization, formed through progressive election from the bottom up, layer by layer, the overall information consolidation in this structure is fulfilled through democratic-decision process and progressive election from the bottom up, layer by layer, to the top.

In one embodiment, a Self-Organizing Wiki (SoWiki) system and method is provided. The SoWiki is a hierarchical, multi-layered and self-organizing wiki system implemented by infusing wiki function with the SOC. Each unit in SOC structure has wiki function. Members create or update contents through wiki methods, which will become effective if the majority of members vote in favor. The elected leader is empowered to take the contents into to a high unit for further consolidation. Recursively, this will lead to a hierarchy structure of information consolidation, which will not only solve information overload, but also minimize the cost given that it is assumed and distributed among all the units/users of the SoWiki.

In one embodiment, the SOC and SOWiki platform provides the self-organization functions for users to create SOC and SOwiki structures, and the systems to support their respective applications and objectives, as well as their needs in terms structure unit, reorganization, and/or collaboration.

In one embodiment, A Self-Organization Information Process System (SOIPS) is one application of SOwiki, which allows users to filter and consolidate the enormous information collaboratively to create various information products targeting in different regions, field or customers, hence to form business models.

Numerous other advantages and features of the invention will be become readily apparent from the following detailed description of the invention and the embodiments thereof, from the claims, and from the accompanying drawings.

DETAILED DESCRIPTION

Figure 1:
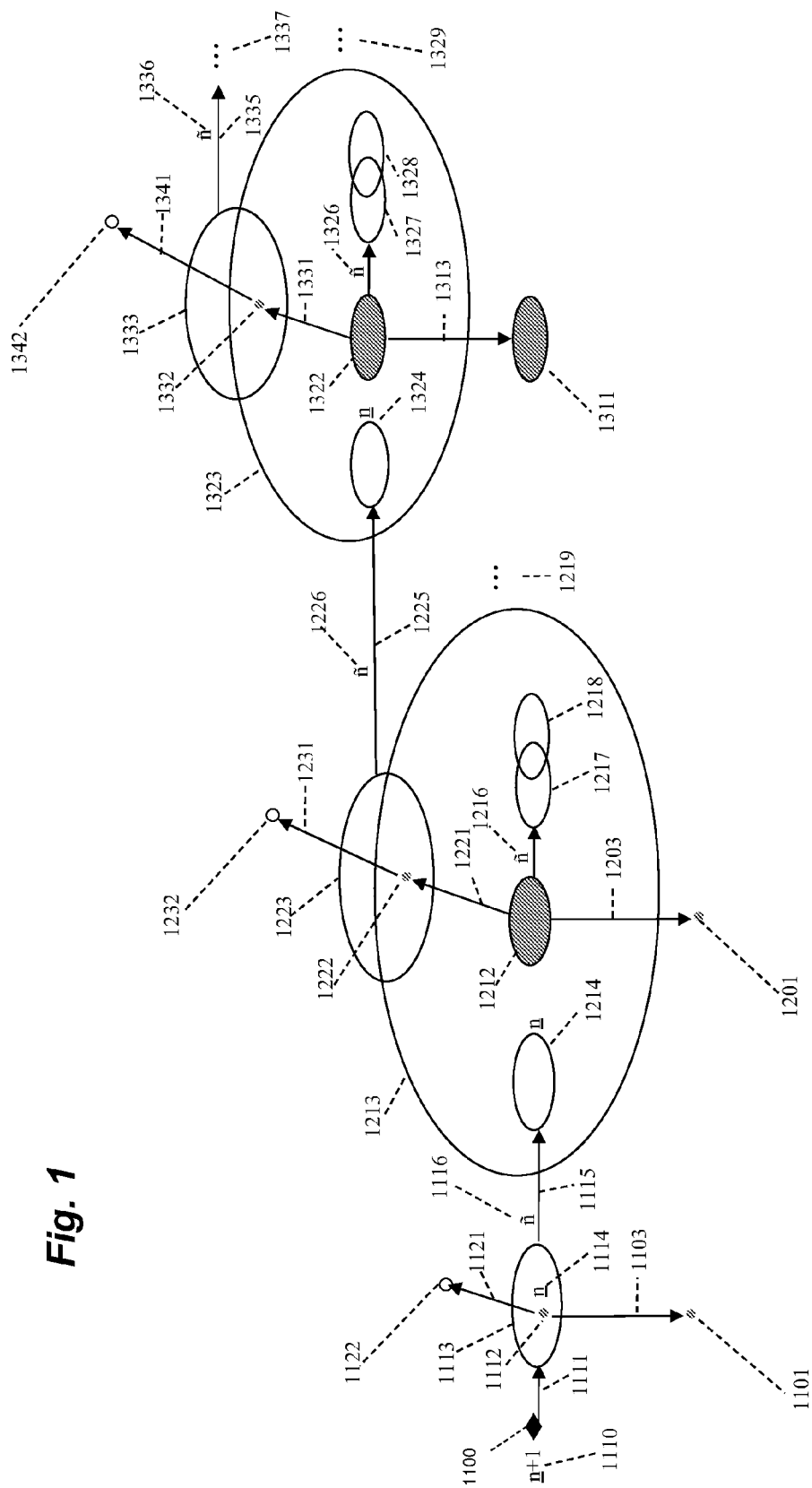
FIG. 1 is a flow diagram depicting an exemplary system and process of forming a SOC (Self-Organizing Community) structure. Starting from inception, SOC expands in size by absorbing new members, grows in hierarchy by unit splitting and new layer creation; the end result of such processes is a hierarchical, multi-layered and self-organizing community, namely, a SOC entity.

A method and system of organizing and filtering information is provided. The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

SOC (Self-Organizing Community)

A SOC (Self-Organizing Community) is a system and method that can be applied to build self-organization structure from nonexistence which grows through a viral expansion loop. The SOC has a mechanism of self-consolidation. The SOC has a hierarchical multi-layer organization, formed through progressive election from the bottom up, layer by layer, the overall information consolidation in this structure is fulfilled through democratic-decision process and progressive election from the bottom up, layer by layer, to the top.

FIG. 1 provides a flow diagram of a SOC showing the one exemplary method of forming a SOC from inception to a hierarchical, multi-layered and self-organizing community.

To build a SOC structure from non-existence, the first step is to gather n+1 (1110) (n>=3) founders or initiators from outside the system, which is generally the only external action necessary. In some embodiments, it is required to have at least three members to form a unit to ensure that the unit does not deadlock and has sufficient diversity of participation. In some embodiments, from this point forward, all the actions are operated within the system with no further external control.

A series of parameters need to be taken into consideration to start SOC system: a value n to limit the size of SOC unit; a required motion second minimum number of members who second a motion for changes to prompt the voting process; a pass ratio to pass a resolution for each type of voting; and an algorithm to calculate weight of each vote (explained below), and an inactivity maximum defining how long a member is allowed inactive etc. System provides default values for all the parameters, but founders/initiators have the options to either use default values or provide values they prefer. In one embodiment, n=3, required motion second minimum number of members is ⅔ of n, the unit pass ratio is a ⅔ of the members in a unit and a leader pass ratio a majority of the leaders at the highest layer of the SOC structure. In some embodiments, a majority vote as referenced in this description may be assigned other values by the system default or by vote of the members, e.g. two-thirds. Whenever there is a suggestion or motion to reset parameter(s) (5303), and the motion receives the a motion second parameter minimum number of members (e.g. ⅔ of n) for change the parameter(s), the system will prompt a voting process and the parameter(s) will be reset if predefined percentage (default value: ½) of all the members and a predefined percentage of the leaders (default value: ⅔) at the highest layer vote in favor.

Figure 5:
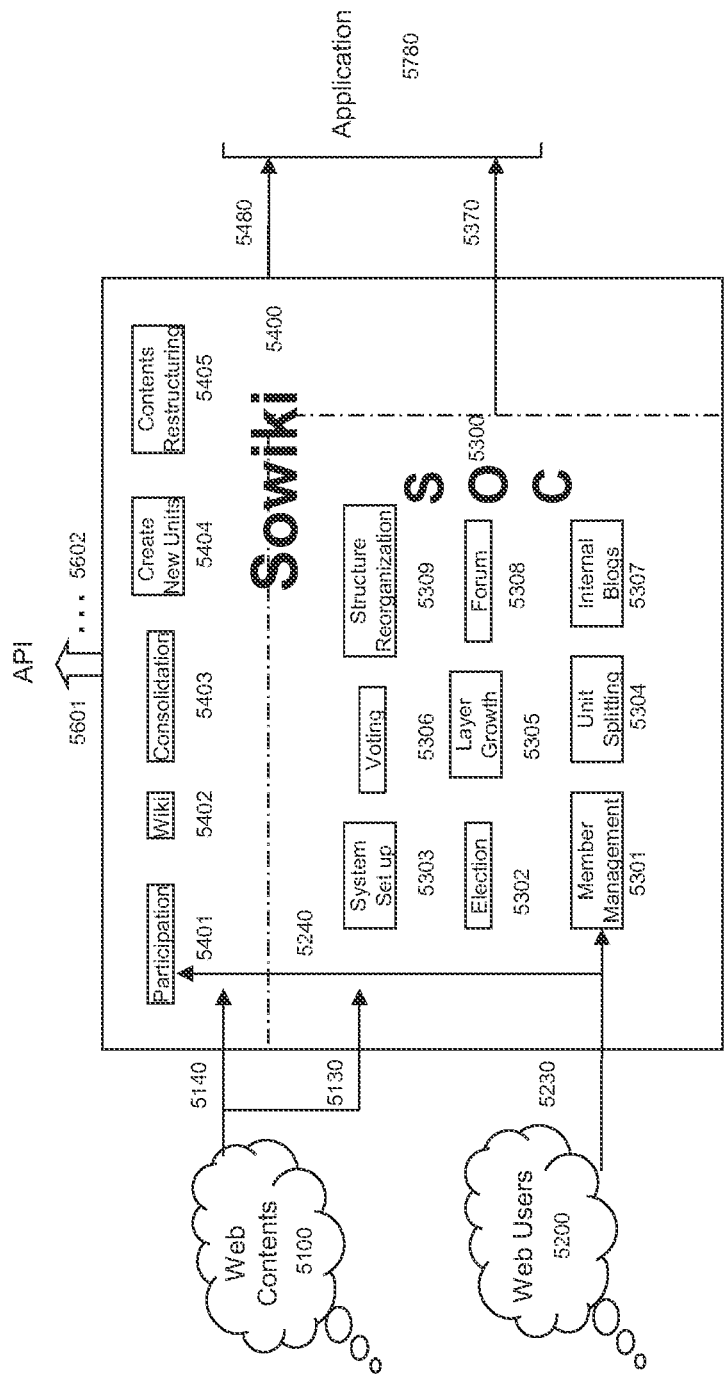
FIG. 5 is a flow diagram depicting some functions of SOC and SOwiki System.

The SOC system also provides functions, tools, and processes for SOC its operation. At least a portion of these functions are shown in FIG. 5. For example, functions, tools, and/or processes are provided for members to set or reset parameter values at any phase whenever there is a suggestion by a member to reset parameter(s) 5303, as long as at least the predefined or member-defined motion second minimum number of members second the motion, system will prompt the voting process and the parameters) will be set or reset if certain percentage (default value: two-thirds) of all the members and of the leaders (default value: ⅔) at the highest layer vote in favor of the change.

SOC system provides multiple interfaces/tools for members to utilize to present information, communicate with each other, and keep records etc. In some embodiments, these interfaces/tools include one or more of a personal blog, a position blog, a unit forum, and a branch forum. In some embodiments, a blog is a webpage or website maintained by its owner having regular or as required entries with, for example, commentary, descriptions of events, or other material including graphics and video. The content can be entered into the blog in blog posts that are normally displayed in reverse chronological order. In some embodiments, a forum is a webpage, a number of webpages, or a website where members can post entries of commentary, descriptions of events, or other material including graphics and video in forum posts. In some embodiments, the interfaces/tools include messaging services, such as Twitter, Skype, email, and other chat services. The system may utilize an application user interface (API) to communite with third party services. The system provides each member of SOC with a personal blog 5307. In some embodiments, all the opinions or activities of a member in SOC are presented and recorded in his or her corresponding personal blog. A personal blog is attached to and moves with its member-owner.

The system provides each leader of the SOC is equipped with position blog 5307. In some embodiments, all the opinions or activities in SOC related to the position are presented and recorded in the corresponding position blog. The blog is only editable by incumbent leader presently occupying the position corresponding to a given position blog but is viewable by members at higher levels than the given position. A given position blog belongs to and stays with the corresponding position. In some embodiment, all contents or records of each position blog is archived by the system, and no removal or deletion is allowed.

The unit(s) at each layer of SOC has two types of forums 5308. The first is a unit forum. A unit form is for unit members to deal with internal affairs of the unit through discussion or decision making (voting) and is not open to the public. Only the members of a corresponding unit can submit inputs to the corresponding unit form. The units that are subordinate to higher unit can view/monitor the contents of the higher unit, but no input from a subordinate unit is permitted to avoid interference. The second type of forum is a branch forum. All the members in a given branch can submit/view inputs and provide feedbacks to the corresponding branch forum. It is a place for opinions. In some embodiments, referendum via a voting module 5306 can be proposed on the forum within the corresponding branch.

Value "n" is a range set to limit the size of an SOC unit, $\underline{n}$ 1100, the minimum size of unit, is a value set to enforce an effective democratic process as is provided by a sufficient minimum number of users. The ñ, the maximum size of unit, is a value set to secure sufficient communication and voting among members of the unit.

The trigger point when a given unit has reached the upper limit ñ is that when the unit can be split into at least $\underline{n}$ (the lower limit of a unit) units, and each unit consists of at least $\underline{n}$ members in addition to the leader.

The first or inceptive unit 1113 should be founded or initiated by no less than $\underline{n}$+1 people 1110, which guarantees that this unit still has no less than $\underline{n}$ 1114 people after its leader 1122 is elected 5302 and promoted to a higher level.

Members 1112, 1222, 1332, 1101 and 1201 in any given layer are represented as dots in FIG. 1 and the shown member has characteristics that are applicable to all the members in that layer. Units 1113, 1212, 1322, and 1311 in any given layer are represented as an ellipse and it has characteristics that are applicable to all the units in that layer.

Each SOC unit has autonomous right to manage its internal affairs, which may include leader election 1121 and new member 1101 recruiting 1103, or their rights as determined by voting processes of the unit, etc. In a given structure, such as layer 1213, the leaders elected 1122 by the subordinate units 1214, 1217, 1218 are to form a new unit 1223 of a higher layer, and as well become new unit 1223 members 1222 who possess dual identities: each assuming all the responsibilities and rights of the corresponding subordinate units 1214, 1217 and 1218 respectively as leaders, and as well, assuming all the responsibilities and rights of the unit 1223 of a higher layer as regular members.

In some embodiment, when voting process is prompted for resolution of an issue or question, the factors used to calculate voting weight are: the voting weight of a leader as a member in the upper unit equals to the sum of the weight of all its subordinate units; and the voting weight of a leader in its own unit equals to the average weight of the unit. The weight of each unit is the sum of the number of members within the unit. The weight of each branch is the sum of the weight of all subordinate units within the branch.

Leaders at each layer 1122, 1222, 1232, 1332, 1342 are elected respectively by the units they belong to. The election can be conducted as requested by a predefined number of unit members or on a predefined schedule. The incumbent leader is not allowed to vote in re-election. Once elected, the new leader will replace the incumbent leader that was not successful in the election.

The members are not allowed to vote for themselves as leader except for the ones in base units. Base units have no subordinate units underneath of them. But if a base unit has failed a predetermined number of times—for example, 5 times—to elect a leader who can meet or exceed the predefined number of votes required for election, the system will interfere so the members in the base units will not be allowed to vote for themselves as leader until leaders are successfully elected.

Whenever a decision is democratically reached by election in a unit, its elected leader is accountable to execute and implement the decision. And the decision is applicable to the unit, as well as its subordinate branch (if existing). A subordinate branch includes all units under or subordinate to a given unit.

SOC can grow by recruiting new members 1101, 1201 from outside of the structure through its lowest/base level by invitation—which is the method available in the initial phase of SOC implementation—or by self-introduction by the potential new member. The base level or layer includes all units not have a subordinate unit underneath of it. The system will prompt a voting process for the unit that prospective member is intended to join to cast votes, and the prospective member will become member officially and assume all the responsibilities and rights if the majority 1100 of the unit vote in favor.

When the inceptive unit 1113 reaches the maximum size of ñ 1116, a splitting process 1115 will be prompted. If there is no upper layer on top yet, e.g. no unit superior to the inceptive unit at the initial stage, the unit will split into no less than $\underline{n}$ new units, each of which should have no less than $\underline{n}$ members, the minimum members for a unit. During the splitting process, members have the option to group freely through coordination. In rare case that such grouping can't meet the requirement within each splitting unit have a membership of $\underline{n}=>n>ñ$ after several repetitions, the system will intervene to re-allocate randomly so that the requirement can be met. The representation of $\underline{n}=>n>ñ$ means that each splitting unit has at least n and less than ñ members.

The open ellipse 1214, 1324 followed with $\underline{n}$ on the right side of each represents $\underline{n}$ units respectively, each of which contains no less than $\underline{n}$ members. When the unit 1113 reaches the upper limit ñ 1116, it will split into $\underline{n}$ 1214 units, which demonstrates SOC structure expansion in size as shown in layer 1213. Exemplary unit 1212 represents any unit of layer 1213, and exemplary unit 1222 represents elected leader of any unit in layer 1213.

The leaders elected from the units in layer 1213 are as well grouped into units, but at one higher level, which has unit 1223, which demonstrates the SOC structure growth in hierarchy. The leaders in layer 1213 are also the members of the higher layer unit 1223. Member 1222 shows such dual identities of being a leader of one unit in layer 1213 and a member in one unit 1223 of the next higher layer. Member/leader 1232 represents leaders of one higher level or layer elected by the units 1223 in the next higher layer.

In some embodiments, the principle to emphasize is that in SOC structure, a leader at any given level can't concurrently be the leader or member at its subordinate level. As shown in FIG. 1, when the unit 1113 reaches its upper limit ñ, it will split into smaller units 1214, and its leader 1122 will advance to become the leader 1232 of its upper level unit 1223 which comprises the leaders of the units 1214. Or if there is disagreement, an election will be held within the units 1214, and the new leader elect from one of the units 1214 will exchange the position with 1122 and become leader 1232.

Unit in 1213 will be prompted into splitting process when it reaches ñ the upper limit 1216. Given it already has an upper unit 1223, it only needs to split into two units to satisfy the requirement for n>ñ and the requirement that any unit should contain no less than $\underline{n}$ members. The leaders elected by the newly split units will join unit 1223 as members. When the unit 1223 reaches ñ 1226, the splitting process 1225 will be prompted. Given there is no upper layer on top yet, the unit should split into no less than n new units 1324 which contain members no less than $\underline{n}$ respectively, the minimum number required for a unit.

During splitting process, members have the option to group freely through coordination. In rare case that grouping can't meet the requirement $\underline{n}=>n>ñ$ after several repetition 1100, system will intervene and re-allocate members randomly to the resulting units so that the requirement can be met. Following the splitting of unit 1223, layer 1213 will be separated accordingly into several groups 1219 of units of same type which have the same structure and follow the same principles.

When reaching ñ, the unit 1223 will split into $\underline{n}$ new units 1324, which leads to SOC's growth in hierarchy or layer 1323. The leaders 1332 elected by the each of the units 1322 form a new unit 1333 of a higher level or layer, and the newly formed unit then elect its leader 1342.

FIG. 1 shows a structure (unit or branch) 1311 either within this SOC or from other SOCs on the same platform. If structure 1311 decides to be transferred under the unit 1322, it will become a direct subordinate structure under unit 1322 and merge with the original structures under the unit 1322 into one SOC structure (unit or branch) if the majority 1100 of the members of the unit 1322 vote in favor of the merger.

Recursively as described above, SOC expands in size as well as grows in hierarchy by constantly, or on demand, or periodically absorbing new members from its bottom level, splitting into new units and forming new layers at higher level.

SOwiki (Self-Organization Wiki)

Figure 2:
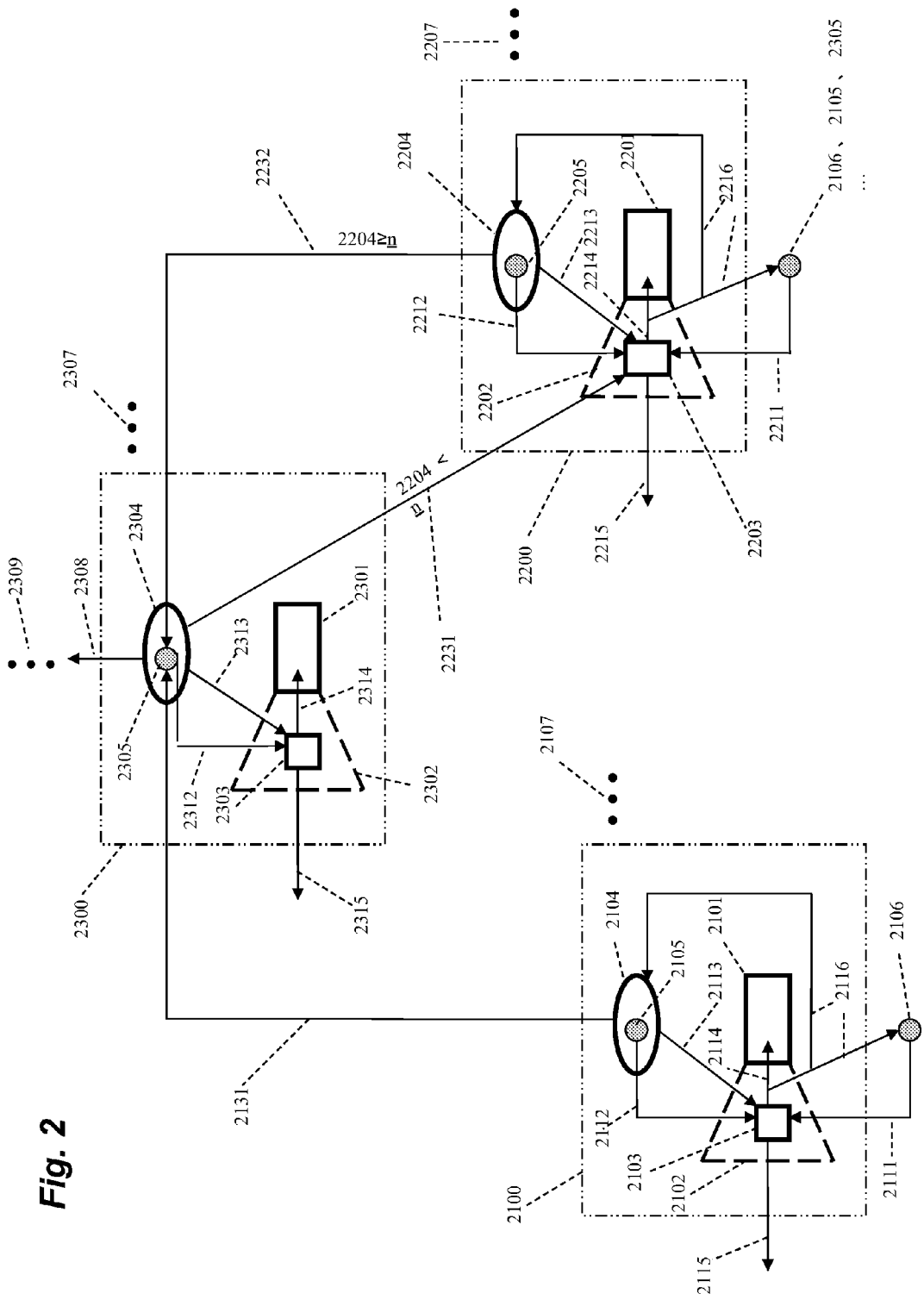
FIG. 2 is a flow diagram depicting the system and processes of creating a Sowiki (Self-Organizing Wiki) structure by infusing a wiki with SOC methodologies, and how objectives at each layer of the Sowiki structure can be achieved and evolved through information gathering, filtering, verifying, refining and consolidating progressively layer by layer from bottom up.

Sowiki (Self-Organizing Wiki) is a hierarchical, multi-layered and self-organizing wiki system implemented by infusing wiki function 5402 with the SOC method. An exemplary SOwiki structure is shown in FIG. 2. Each unit in SOC structure has wiki function carried out by the wild tool as described below. Members can create or update contents through wiki methods with the wiki tool, which will become effective only if the majority of members vote in favor. The leader elect is empowered to take the contents into its upper unit for further consolidation. Recursively, this will lead to a hierarchy structure of information consolidation, which will not only solve information overload, but also minimize the cost given that it is assumed among all the units/users.

In some embodiments, creating a Sowiki structure starts with a SOC initially, that is accountable to define and determine the objectives and form of the SOwiki structure through SOC democratic-decision mechanism. Sowiki structure can be then established by transforming all the members of the SOC into the Sowiki structure as founders or initiators, and expand/grow by absorbing new members on demand, periodically, or constantly.

The method of Sowiki's absorbing new members is similar to that described for SOC: both absorb new members from base layer through invitation or self-invitation. SOC absorbs new members mainly through invitation, but Sowiki mainly through self-introduction in that a prospective member participates by providing submissions, inputs, or content, such as information, webpages, portions or webpages, video, pictures, text, or other content, through a Wild at the base layer, and will then become the new member 5401 if the majority 1100 of the member of the unit that the prospective member is intended to join vote in favor of the inputs or contribution provided to the Wiki by the prospective member.

Sowiki structure operates as detailed below.

Units at Base Level

In the FIG. 2, a functional area 2100 of existing units at base level of a Sowiki structure is shown. Each unit in functional area 2100 may include one or more projects 2101 that the unit in functional area 2100 is working on through participation and collaboration using wiki tool which allows any changes to be submitted in the mode of wiki editing, where inputs and changes are logged by the wiki tool and are not made effective unless approved by the pass rate minimum number of members of a unit upon a vote of those members. In some embodiments, the wiki tool is a website that allows the creation and editing of any number of interlinked web pages via a web browser using a simplified markup language or a WYSIWYG text editor. In some embodiments, the wiki tool is that described in U.S. Pat. No. 7,954,052, which is herein incorporated by reference to the extent not inconsistent with the present disclosure and except to the extent than according to the present invention edits and changes made to content via the wiki tool are not made effective to the unit project until a majority of the members of the unit where the edit or change was made must approve the edit or change by a predefined approval minimum number of members of that unit before the edit or change is accepted. The outcomes of the projects are dynamic and up-to-date by periodically, on demand, or constantly reflecting new participations and inputs in a timely manner. An inceptive unit 2104 creates projects 2101, and is entitled to manage and consolidate the project outcomes. The updates to projects 2101 will become effective by the system only if the majority 1100 of the members of the unit 2104 vote 2113 in favor, which reflects the basic rule of Sowiki.

The participation in projects 2101 comes from two directions: one from one or more members 2105 of unit 2104 shown as member participation 2112, another direction from one or more external users 2106, which may represents any individual of same categories outside the unit 2104, such as member from other units either within or outside this Sowiki structure, shown as external input 2111.

The inputs 2103 from a participant, such as a member or a unit 2104 via member participation 2112 or an external user via external input 2111, will not be accepted automatically into the project 2101, but will be temporarily stored in the mode of an editable Wiki 2102 pending approval from unit 2104 to become effective. The inputs 2103 will become eligible 2114 and be added into 2101 if the unit 2104 votes in favor; otherwise, the inputs 2103 will be discarded 2115.

External users 2106 from outside of the Sowiki structure can only participate through units at base level. Units above base level only allow its official members to work in its functional areas as shown in functional area 2300. Inputs from external users 2106 will become effective only if the majority 1100 of the members of the unit 2104 vote 2113 in favor and external user 2106 will then be automatically invited to become a member of the unit 2104, as shown by the invitation routes 2116 pointing to 2106 and 2104.

Because SOwiki is used to create/verify contents, the members who have not participated in any work, including inputs or decisions, for predetermined inactivity period might lose the familiarity or understanding of the contents of the project, so the system will categorize such members as "inactive members". When calculating the weight of a vote for a member in an upper unit, the system won't include any inactive members in its subordinate units. However, the inactive members can become active and be included in the weight calculation as soon as they resume their participation.

In general, the base units of Sowiki structure are open to the public in order to absorb new members. But Sowiki structure has the option to choose to be exclusive so that only members can participate in its activities. In such case, the system sets parameter for 2106 to allow only internal member participation.

Multiple functional areas 2107 of base units can be provided under functional area 2300 at upper layer. Similarly, multiple functional areas 2207, of second level units can be provided under functional area 2300 at upper layer and multiple functional areas 2307 of third level units can be provided.

Units at Upper Layer

Functional area 2300 at upper layer has the same structure as 2100, comprising units 2304, projects 2301 and Wiki 2302.

The units 2304 in 2300 are comprised of leaders 2305 elected by the units 2104, 2107 of the next directly subordinate layer. The elected leaders will automatically become member of its upper units 2304. Recursively, new layers will be formed progressively layer by layer as shown by arrow 2308.

In Sowiki structure, all the units except ones at base layer are formed by the leaders elected by their directly subordinate units using the principal rules of the SOC method, namely, the "progressive election layer-by-layer" depicted in FIG. 1.

Project outcomes/contents at base layer are open to the public for editing, but the ones at upper layers can only be edited by members of the unit that the project belongs to: such as the project outcomes/contents 2301 in the functional area 2300 can only be edited by the members of the unit 2304. However, except the right of editing, any unit has the authority to decide the right of participation from outside (within or outside of the structure, such as members of other units or external users) regarding attendance of discussions within a unit, viewing contents within a unit, etc., which can be provisioned through setting parameters. This so-called "right of progressive editing" is applicable to all layers. Outcomes/contents become effective only if they are approved by the unit they belong to through voting, regardless of layer they are at.

For instance, the leaders 2305 will adjust and consolidate the project contents or deliverables 2101 submitted from the subordinate units such as 2100, 2107 with respect to overall objectives and requirements of project 2301 and ensure they are consistent with its existing, if any, outcomes/contents in 2301. The adjusted and consolidated results/inputs 2303 won't be accepted automatically by the project 2301, but will be temporarily stored in the mode of an editable wiki 2302 pending approval from unit 2304 to become effective. The inputs 2303 will become effective and be added into project 2301 if unit 2304 votes in favor, otherwise the inputs will be discarded 2315, the leaders, as well as the members of the subordinate units have to repeat the steps mentioned above until their submissions are approved and added into project 2301.

After the project deliverables from 2101 are all validated and added into project 2301, every member 2305 of unit 2304 is eligible to edit any section of project 2301 (including the ones that are not submitted by his/her unit) to dynamically reflect updates from subordinate units. The updates will be submitted in the through the wiki tool providing a mode of Wiki editing for approval. The input will become effective 2314 if unit 2304 votes in favor, otherwise ineffective 2315.

When the members in an upper unit of SOwiki structure need to vote on certain issues—i.e. participation, content examination etc., the voting result is based on the votes as weighted from each member: the weight of vote of each member in an upper unit is equal to the total members of the branch underneath the unit from which he is elected as a leader.

The consolidation mentioned above periodically, on demand, or continually elevates progressively layer by layer from bottom up. In one embodiment, the Sowiki can be implemented in an example of writing a book through collective effort of multiple authors: if project 2101 represent sections of a book, then project 2301 can be considered as chapters of a book which are consolidated from the sections in project 2101, progressively by applying the same rules to the bigger consolidation areas, chapters are then consolidated into books, books into collection of works and so on. Continuation 2309 represents such elevation.

The project outcomes/contents at upper layers are also dynamic by reflecting updates that rapidly bubble up progressively layer by layer from bottom: on the one hand, subordinate units require their leaders elected to reflect updates to the upper units; on the other hand, leaders won't just report updates passively, in addition to self-actualization, leaders are motivated as well by a SOC promotion mechanism that promotes leaders who aggressively pursue the units directions. The SOC promotes a democratic system where a leader of a unit will be motive to effectively pursue the will and direction of the unit, as expressed through voting, otherwise the leader could lose the leadership position at re-election or on demand by a re-call vote of the members of the unit.

The democratic operation mechanism of SOwiki structure can prevent the leaders elected at each layer from being negligent in terms of reflecting updates, or neglecting proper representing their corresponding units. This control comes from following aspects: a subordinate unit can recall its leader anytime through election; all the information at any upper layers is transparent to their subordinate layers; leaders' inputs to the upper layer have to be approved by the upper unit through voting. Therefore, participation in Sowiki structure is not random, only members and leaders that promote the overall objectives of this SOwiki structure will be accepted by the other members and leader.

Creating New Unit

By creating new units, Sowiki structure can dynamically self-grow both in size and in hierarchy. The self-grow process is detailed as below.

In the Sowiki structure, any unit either outside of the structure, such as from external users 2106, or inside of the structure, such as from members 2105, can apply to a targeted unit such as unit 2304 to create a subordinate unit such as unit 2204 and its functional area such as functional area 2200. This new unit 2204 is to assume certain sub-project(s) of the overall or parent project such as project 2301 of the targeted unit such as 2304. The new unit will become part of the Sowiki structure and undertake the assumed responsibilities if the targeted unit such as 2304 votes in favor. The applicants for creating such a new unit will become initial members of the new unit.

Regardless which layer a new unit is to be created under, it will have all the attributes of a unit at base layer given it has no subordinate units at the time of creation. Members or users either from external of the Sowiki or internal of the Sowiki 2106, 2105, and 2305 are eligible to provide input 2211 for consideration in the projects 2201. And the inputs 2203 will be submitted via the wiki tool in the mode of an editable Wiki 2202 pending approval from the unit 2204. However, the inputs 2203 submitted 2212 by the members 2205 of the unit 2204 require the same type of approval.

The new unit 2203 is not eligible to vote if the number of its members is less than $\underline{n}$. The right of voting will be surrogated by its upper unit 2304. The inputs 2203 will become effective 2214 if unit 2304 votes 2231 in favor, otherwise, will become ineffective or discarded 2215. The voting right will be restored to the unit 2204 once the number of the members of unit 2204 is equal to or greater than $\underline{n}$.

Once the inputs are approved by the new unit or its upper unit, the participant who provided the inputs will automatically be accepted as member of the new unit and assume all the responsibilities and rights of a unit member 2205 via path 2216.

Once the new unit 2204 grows to a point of having a numbers of member equal to or greater than $\underline{n}$, it becomes eligible to operate independently by assuming all the responsibilities and rights of a regular unit such as making decision for the unit by voting 2213; electing 2232 its leader to represent the unit in its upper unit 2304 etc. Unit 2304 will no longer play the role of guardian or surrogate for unit 2204, and functional area 2200 will operate the same as functional area 2100 from that point forward.

Unit Splitting

The Sowiki structure is constructed for the objectives of its projects with respect to contents, which should not be divided randomly by Sowiki. So Sowiki unit will not split automatically as occurs with the SOC method when the unit reaches its upper limit, which is why Sowiki structure only prescribes the lower limit $\underline{n}$ of a unit; the upper limit $\tilde{n}$ will be defined by unit according to the nature of its project instead being set rigidly by system. The Sowiki unit will split if the majority of its members agree that their project can and/or should be split into branches.

The process of Sowiki unit splitting provides that, when the unit to be split has no upper layers, the projects of the splitting unit will be split into $\underline{n}$ sub-projects first based on the decision democratically made by the unit through voting, and the members of original unit will then be associated with sub-projects around which the new subordinate units are formed. If the original unit is at base layer, its members will populate the new subordinate units by choosing the sub-project they are interested in, otherwise, they will populate new subordinate units by choosing the sub-project that the units they are representing are interested in respectively. However, each unit has to meet the requirement for having no less than $\underline{n}$ members. In the case of deadlock where the unit splitting cannot meet the minimum $\underline{n}$ members requirement after several 1100 repetition of the steps mentioned above, system will intervene and splitting process will be completed by system randomly or according to a predefined algorithm that is designed to simulate random placement, such an algorithm that utilizes numbers provided by an algorithm that simulate the random output of number known in the art. But when the unit to be split has upper layers, it can be split into less than $\underline{n}$ subunits which are all subordinate to the original upper unit in the higher layer.

The units above base layer can decide autonomously if they should grow/create new subordinate units, the process of which is similar to that of splitting except that the process of creating new subordinate units does not need to comply with the constraint that the original unit is required to split into no less than $\underline{n}$ subordinate units. The newly created subordinate unit will be at the same layer of, and in parallel with, the original subordinate units under the senior unit that indicated the subordinate unit creation. New subordinate unit can be created flexibly whenever needed.

SOC and SOwiki Structure Reorganizations

Figure 3:
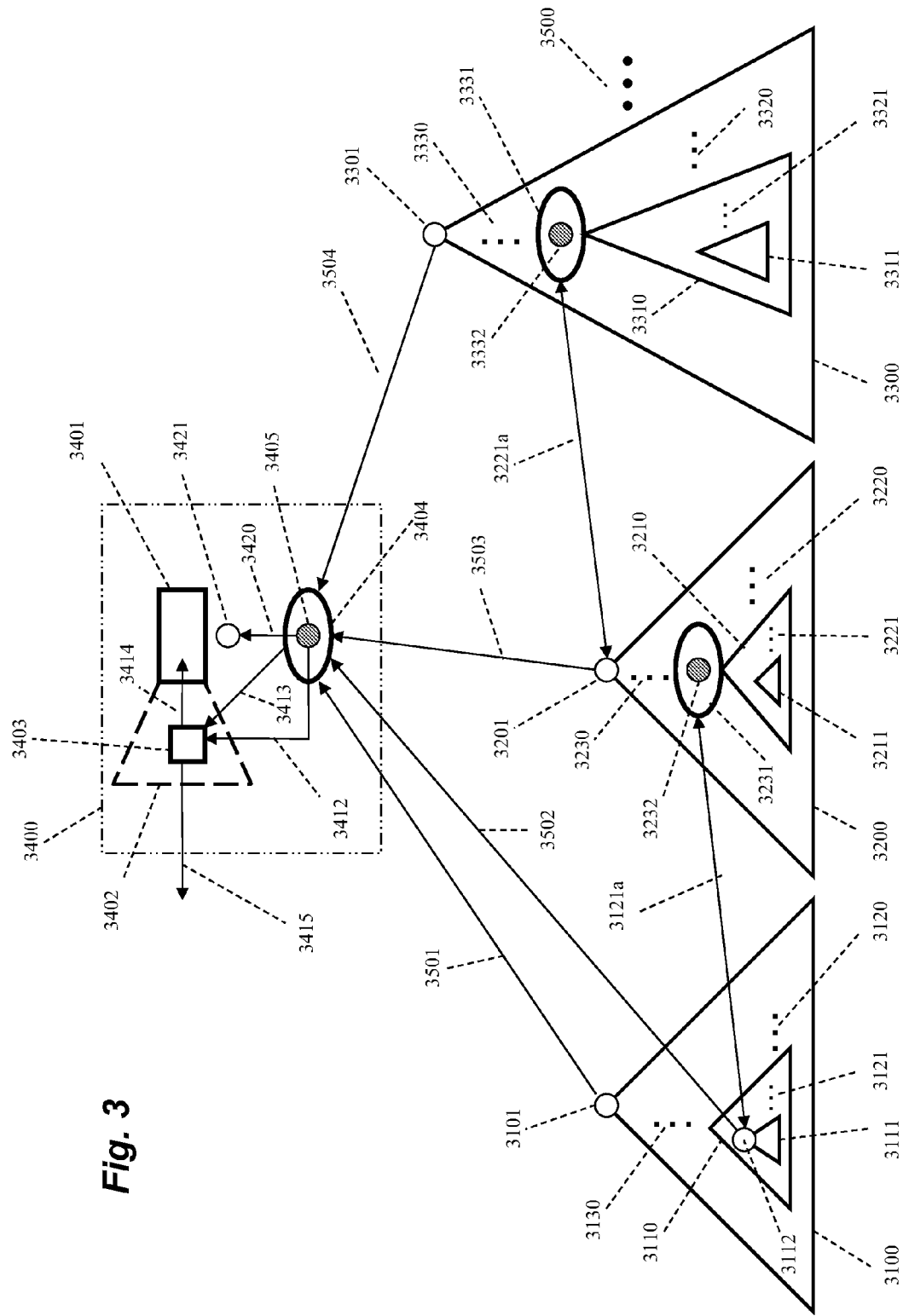
FIG. 3 is a flow diagram depicting the system and processes of SOC and SOwiki structure reorganization by creating dynamic and rich forms of SOC or Sowiki structures through unit or branch transferring, merging, seceding or affiliating within the same structure or among different structures.

In FIG. 3, triangle represents branches of Sowiki structure and a small triangle in a big triangle represents a small branch within a big branch. The lateral ellipses 3121, 3221, 3321, 3120, 3220, 3320, 3500 represent the lateral expansion by the addition of the same respective structures laterally along the same layer or level. The vertical ellipses 3130, 3230, 3330 represent hierarchical expansion by layers respectively upward.

The highest elected leaders 3112, 3101, 3201, 3301, 3421 in each respective branch are shown. Further, in FIG. 3, the highest unit 3231, 3331 and 3404 in a respective branch are shown and members 3232, 3332, 3405 of the highest branch respectively are shown. Details for certain units or portions of branches are not shown in FIG. 3 so as to demonstrate the overall structure.

Structure (Units or Branches) Transferring

When a unit or branch in a Sowiki structure secedes from its upper unit, and joins under another unit within the same Sowiki structure is called transferring.

In case that branch 3100 and branch 3200 belong to a same Sowiki structure, and structure 3111 (which may be a unit or branch) decides to transfer under or within branch 3210, the elected leader 3112 of the structure 3111 will need to file application to the upper unit 3231 (consisting of the elected leaders 3232 from the units 3211 and 3221) for such transfer. Structure 3111 will then be transferred into 3210, hence become a subordinate structure 3221 under the unit 3231 if the unit 3231 votes in favor; the elected leader 3112 will become a member 3232 of unit 3231. If structure 3111 is a branch with subordinate units, the whole branch (including all the subordinate units) will be transferred together into branch 3210.

The Sowiki structure will not allow a unit or branch to have more than one immediately senior/upper unit to avoid overlapped voting rights. Therefore, the first step of transferring is to secede from the original upper unit in order to avoid having two immediately superior unit.

Whether or how the transferred units can take away the projects they are working on to the new structure depend on the setting of the Sowiki structure based on the agreement achieved within the structure. Therefore, in some embodiments (1) the transferred unit can take all of the projects currently pending to the new structure, (2) the transferred unit can not take the projects currently pending to the new structure, and (3) the transferred unit can take the projects currently pending to a new structure only if a majority of the members of the immediately senior unit above the transferred unit approves of the transfer of currently pending projects.

Structure (Unit or Branches) Merger

One of the methods to merge units is to combine different units within the same Sowiki structure, along with their projects and members. If the to-be-merged units are subordinate to the same upper unit, they, as well as their projects and members, can merge into one bigger unit if the majority of the immediately upper unit vote in favor for the motion of merger. The merged unit will then assume all the responsibilities and rights with respect to the combined projects.

The units, that are within the same SOwiki structure, but subordinate to different units, can merge provided that the upper unit of the unit at the receiving end votes in favor to the motion of taking over the unit that has applied to merge in. The unit to be taken over will be required to "transfer" (refer to transferring section) first under the upper unit at the receiving end and then merge as demonstrated in the proceeding paragraph.

Another method of merging is with respect to different Sowiki structures. Therefore in some embodiments, it is assumed that branch/structure 3200 is an independently created and self-evolved Sowiki structure and decides to merge into structure 3310 in another Sowiki structure 3300 and to be one of structures 3321 at the same level with structure 3311, the highest elected leader 3201 of the structure 3200 will need to file application 3221a to the unit 3331; The structure 3200 will be then merged into structure 3310 and become one of the structures 3321 and leader 3201 will be accepted as a member 3332 of unit 3331 if the majority of the members of unit 3331 vote in favor of the merger. Whether a structure is accepted for merger depends on the vote of the receiving superior unit as well was whether the resulting merge structure will violate any parameters of the system, such as structure size, which is considered by the receiving superior unit.

Structure (Unit or Branch) Secession

As mentioned above, the process of a structure (unit or branch) transferring consists of two major steps: secede from its original upper unit first; and then merge into the targeted structure. Alternatively, a structure can decide to secede from the Sowiki structure it belongs to and become an independent Sowiki structure.

It is the given right of Sowiki unit or branches to secede, but the key is if the projects they are working on can secede as well and go along with the seceding structure, which requires the agreement or contract with respect to secession being established during the inception of Sowiki structure. The agreements or contracts can be executed and guaranteed by the Sowiki operating system/platform through parameter setting.

If the secession leads to that the members of the original unit become less than $\underline{n}$, the seceded unit will lose its right of autonomy, which will be surrogated by its upper unit, and reinstated once the number of its members grows to no less than $\underline{n}$.

Structure (Unit or Branch) Affiliation

Horizontal affiliation is to achieve specific objectives by uniting different Sowiki structures without losing their attributes and intactness as independent structure (unit or branch). The affiliation is of extensive applicability and can be either temporary or permanent.

Horizontal affiliation can be created by loosely uniting different units or branches within a Sowiki structure. In some embodiments, assuming that 3111, 3200, 3300 are different branches in the same Sowiki (they might be at different levels, but this will not have an impact on affiliation), the process to unite them requires that the highest elected leader of the affiliating branches 3112, 3201, 3301 reach agreements for affiliation in terms of objectives, parameters and new leader election 3421 etc. with respect to the new structure (each affiliation is considered as creating a new structure) by negotiation and collaboration. The leaders from each original structure form a new unit 3404 and the affiliation will then be administrated by the leader 3421 elected by unit 3404 or directly by unit 3404 working as a committee. Once the affiliation is created, its functional area 3400 will be automatically created by the Sowiki platform and open for use.

The members 3112, 3201 and 3301 of the unit 3404 at highest level of the Sowiki affiliated structure will adjust and consolidate the projects they are representing respectively with respect to overall objectives and requirements of unit 3404. The adjusted and consolidated input 3403 won't be accepted automatically by the project 3401 and will be temporarily stored in the mode of an editable wiki 3402 pending approval from unit 3404 to become effective. If unit 2404 votes in favor 3413, the inputs 3403 will become effective and be added into project 3401; otherwise, the steps mentioned above are repeated until approved and added into project 3401. Further adjustment and consolidation of project 3401 by the unit 3404 follows the general Sowiki rules and principles depicted in FIG. 2 and the related description.

However, this horizontal affiliation can as well be created by uniting units or branches from different Sowiki structures. In some embodiments, if it is assumed that 3111, 3200, 3300 in FIG. 3 are different Sowiki structures, the flow diagram of creating such an affiliation is the same as demonstrated above.

Once the affiliated structure is formed, the appropriate forums, wiki areas, position blogs etc, will be created automatically by the platform and open for use as detailed in the section above on the SOC.

The affiliation can be objective oriented or structure oriented. The objective oriented affiliation is usually temporary and will be dismissed after the objectives are achieved. The structure oriented affiliation usually has long-term goals and therefore more stable.

Such affiliation is realized only through the leaders at the highest levels i.e. 3100, 3200, 3300 and each individual Sowiki structure is kept intact and can be removed from a new structure and restored to original structure easily. This loosely connected structure keeps the advantages of small structures: higher-level of autonomy, efficiency and varieties etc., as well has the benefits of big structure: broader spectrum of view, more resources.

Affiliations can cross and overlap, for instance, the leader elected 3421 of the affiliation can choose to unite with another structure to form a new structure with respect to new projects or new objectives.

In summary, SOC and Sowiki have rich and flexible ways of evolving horizontally or vertically in terms of hierarchy and size by utilizing the methods and functions mentioned above such as new units creating, unit splitting, unit merging and combining etc., hence to achieve an evolving space to accomplish very effectively various objectives.

Self-Organization Information Process System (SOIPS)

Figure 4:
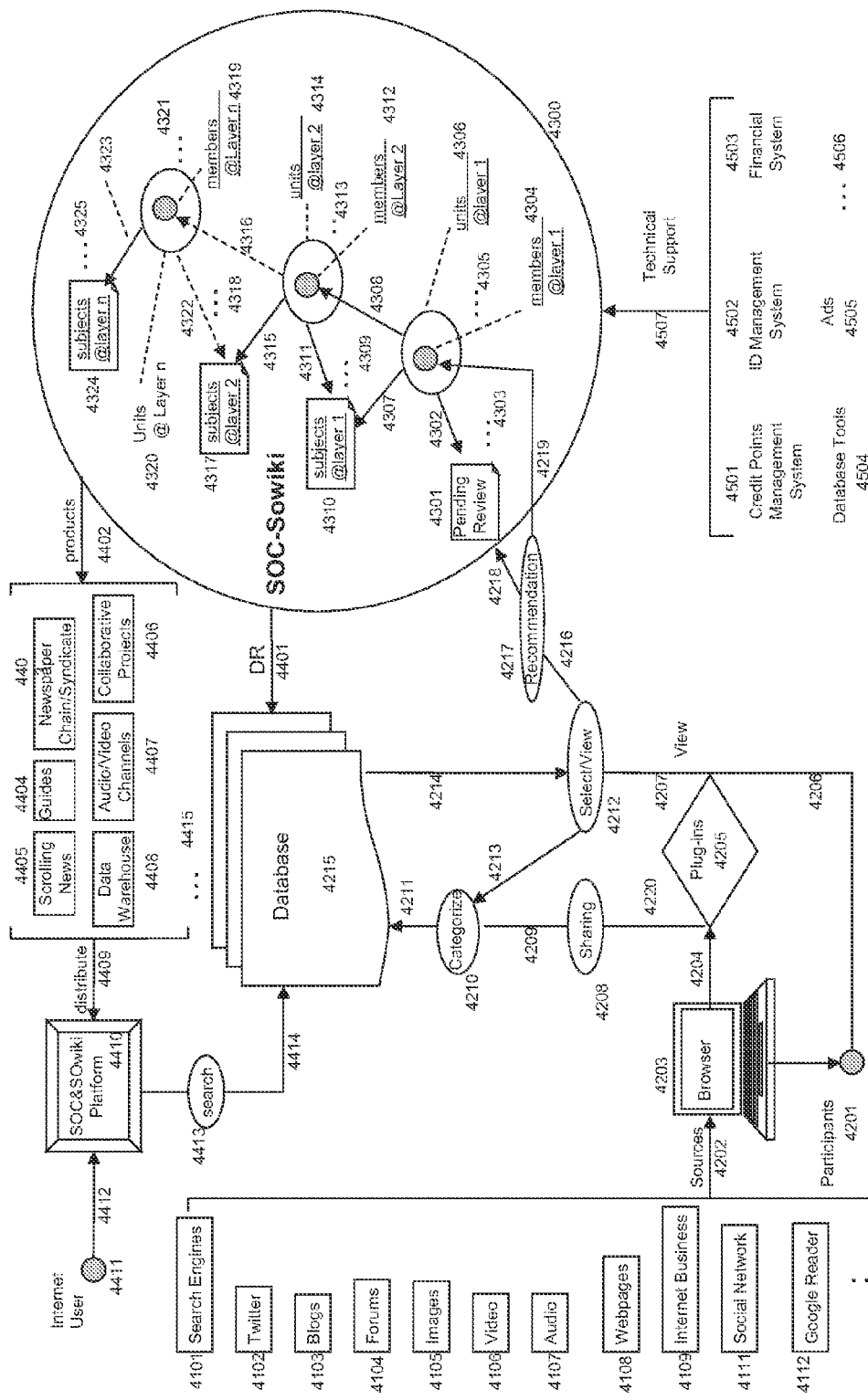
FIG. 4 is a flow diagram depicting how users use the Self-Organization Information Process System (SOIPS) to filter, consolidate and refine the web information through SOC-SOwiki structure layer by layer from bottom up, based on which how various information products are created.

The flow diagram FIG. 4 depicts how users may use a Self-Organization Information Process System (SOIPS) to filter, consolidate and refine web information through SOC-SOwiki structures layer by layer from the bottom up, based on how various information products are created. In one embodiment, the SOC, SOwiki, and SOIPS are systems and methods of the distributed allocation of work.

The grey dots in the FIG. 4 represent any one item of the same categories in which all the items possess the same attributes. The solid dots represent multiple projects of same kind.

Participation

As shown in FIG. 4, any web user can become a participant 4201. The SOIPS provides a user interface. In some embodiments, the SOIPS includes a standalone program installable on a user's device, such as a computer, tablet, mobile smart phone, or other programmable computing device. In some embodiments, the SOIPS includes an internet web browser plug-in 4205 that is installed in the user's browser 4203. In some embodiments, the SOIPS is accessible over, a computer network, such as the Internet via the browser 4203 without the need of any software installed on the user's computer or computing device.

Information is submitted to the SOIPS computer database 4215 by participants. In some embodiments, access to the database, may be mediated through a database management system, such as those known in the art. When a participant 4201 browse or process web information, if the participant believes that some information, content, data—such as a website, webpage, or a portion of a webpage, such as a paragraph, headline, picture, video, or the like—is worth sharing, the participant can click the Share button 4208 provided by the plug-in 4205 or other user interface, and the information will be automatically collected by the SOIPS, processed into standard format, and then stored in the computer database 4215.

Figure 6:
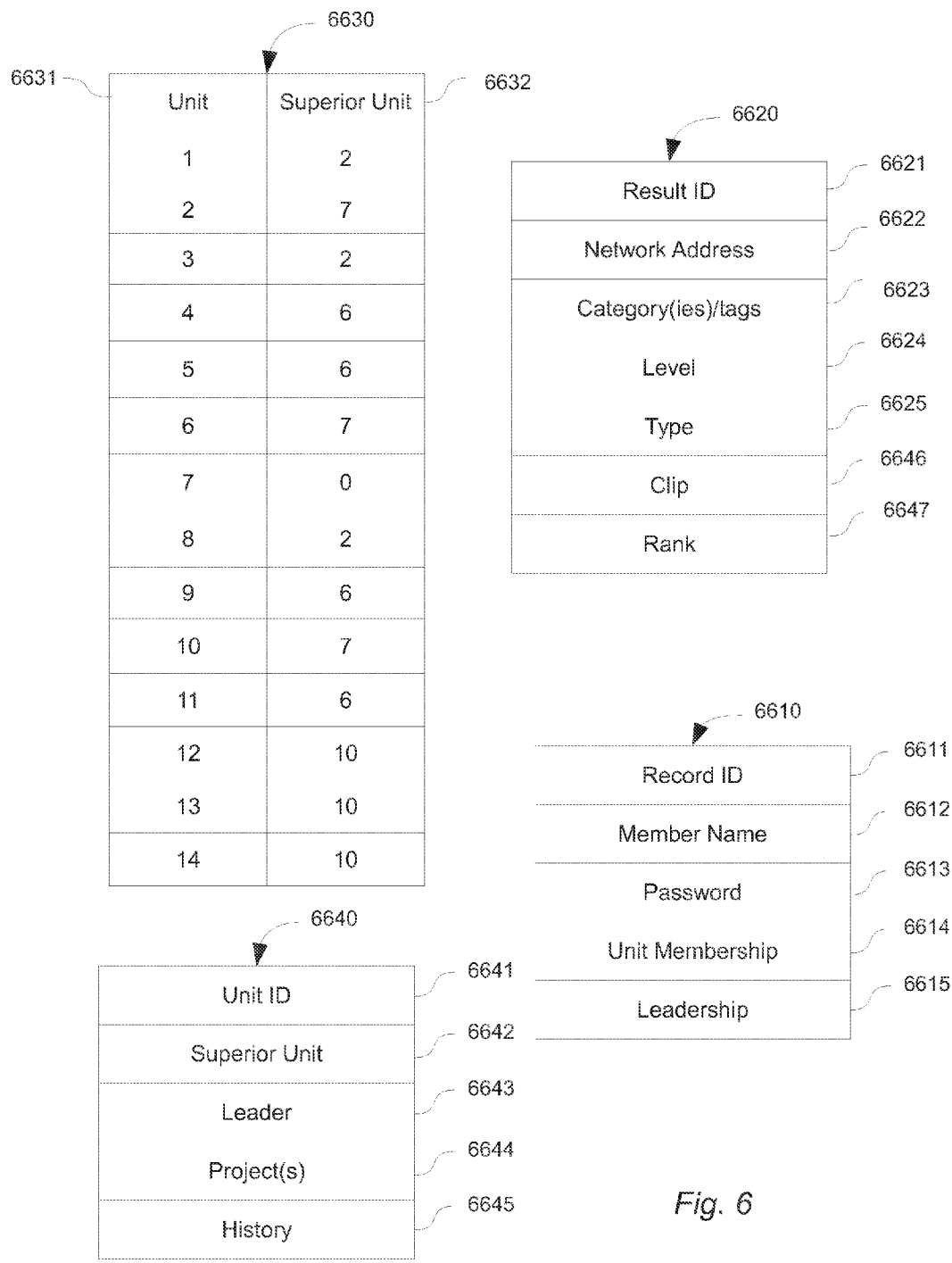
FIG. 6 is a diagram view of a relationship table, a unit record, a link record, and a member record of an embodiment of the invention.
Figure 7:
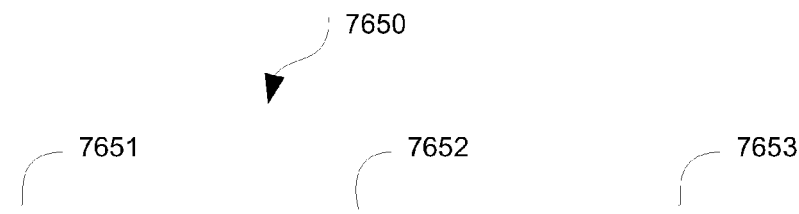
FIG. 7 is a diagram view of a user table of an embodiment of the invention.

Some embodiments, the information shared by the participant is saved in a link record 6620 as shown in FIG. 6. The link record includes a result ID section 6621, a network address section 6622, a category(ies)/tag section 6623, a level section 6624, a type section 6625, a clip section 6646, and a rank section 6647. The result ID is a unique result indentifier, such as a number. The network address section 6622 contains information about where the content is located on the network. The network address section 6622 may be a Uniform Resource Locator (URL), an IP address, a page location indicator for identifying where on an Internet web page the selected content is, or any combination of the forgoing, or other network location information formats known in the art. The category(ies)/tags section contains one or more categories or tags that purport to classify or describe the information associated with the network address. Tags and categories maybe chosen from system defined lists or may be freeform entered by a user or member. The type section 6652 contains information about what type of information is found at the network address, e.g. text, video, pictures, animation, or other classes of content. The clip 6646 may section contains a portion of the content at the network address. The clip section may contain a section of text, an image, a thumbnail of an image, a section of video, or the like. The rank section 6647 contains the DR rank, as explained below, of the contents associated with the network address.

Information can be submitted to the SOIPS from any Internet or network source, such as search engines 4101, Twitter 4102, blogs 4103, forums 4104, images 4105, video 4106, audio 4107, webpages 4108, Internet business 4109, social networks 4111, RSS readers 4112, etc.

In some embodiments, the computer database 4215 is connected to a server or other computer (not shown) for providing access and modification to the database. The database maybe maintained on a computer storage, such as a hard-drive, a number of hard-drives, solid state storage, or other database storage mediums known in the art.

Each participant can categorize 4210 the information to be shared by adding one or more tag. Tags may be understood as a keyword(s), or term(s) assigned to a piece of information, which may provide additional information about the information being tagged. Tags may be understood as metadata for the information being tagged. In some embodiments, the SOIPS has a duplication reduction function that can process the data submitted by participants to consolidate data about the same information that might be submitted by different participants. In some embodiments, the SOIPS has an automatic categorization function where by comparing the content of the information submitted to a pre-existing word association database, the categorization function can add tag and category information based on matches generated.

As information is submitted to the SOIPS, a large dataset may be accumulated. Participants filter the information. After the steps mentioned above, the enormous and complex internet information in this database is filtered by participants, has formed the preliminary category structures, hence possess the value to "Select/View" 4216, and will be also given the DR value (see the section "DjRank for details).

The SOIPS has a select/view function 4212 that allows a participant to select and review information in the database 4215. The view/select function allows a user to define or select the categories 4210 of information that each user wishes to review. In some embodiments, participants or users 4201 only need to click the "Select/View" button on the plug-in 4205 to select and review the filtered/categorized/tag information that they are interested in. And the SOIPS will automatically assign 4214 certain contents to a participant, such as a small fragment of contents within the subjects/categories area chosen by or preset by or for the user that they are interested. Each participant will be given different non-overlapped fragments of the contents within the database 4215. The select/view function divides the contents of the database under according to certain predefined characteristics, such as categories and apportions a subset of that data into affordable or manageable assignments to be assumed and processed by a plurality of corresponding participants.

The SOIPS has a recommend for promotion/recommendation function 4217 where a participant, at the time of select/view function 4212 can vote or decide whether the information begin reviewed, in the participant's judgment, is valuable for the given category of information. If the participant finds the information valuable, the participant can through the recommend for promotion function 4217 recommend said information as being valuable for the corresponding given category(ies) of information. In one embodiment, the SOIPS provides a recommend button that a participant can press to recommend the reviewed information during the review process.

The SOIPS also provides a re-categorize function so that each participant can not only recommend the contents further that he/she believes are of any value by clicking the the recommendation button, but can also correct or further categorize 4213 the information being reviewed. If there are enough participants, although each only assumes a fragment of the contents of the database, a second round of filtering and consolidation utilizing the SOIPS with respect to the data stored in the database can be achieved.

SOC System and Method

The contents that are recommended under the recommendation function 4217 by the participants 4201 during Select/View function 4212 will be added into SOC-SOwiki structure 4300 (see FIG. 4) pending further review under the pending review function 4301.

The information in the pending review function 4301 will be automatically categorized and tagged by the SOIPS system. In some embodiments, the SOIPS has an automatic categorization function where information is categorized based on keywords extracted from the information which can be based on the full text of the information, the title of the page having the information, the backlinks to the page having the information, the anchor text associated with the backlinks to the page having the information. In some embodiment, the automatic categorization of information in a search database maybe any such function or method known in the art and not inconsistent with the present disclosure. The SOIPS will then assign information queued in the pending review function to one of the units 4306 in layer 1 of the SOC-Sowiki. In one embodiment, each of the units 4306 has one or more categorizes of information that it is assigned to review and the SOIPS assigns information queued in the pending review function to one or more units based on each having an assigned category corresponding to the category of the information queued. Once information is assigned to a unit 4306 in layer 1, it is further assigned by the SOIPS to a layer 1 member 4304 of that layer 1 unit 4306, for further assessment or correction. For instance, the information will be corrected if the previous categorization is not accurate and then be returned to pending review function 4301, and the system will then reassign the information to a different unit 4306 of that layer having unit category corresponding to the category of the information.

The system provides a two step information review. The first step is a preliminary review by a member of layer 1. Each layer 1 member 4304 will perform a preliminary review of the information that the system has assigned them. If the member believes that the information is worthy of further recommendation, the member 4304 will preliminarily recommend that information by signaling the same to the system. At the second step, the system initiates a unit vote where the contents recommended by layer 1 members of a unit will be sent by the system to all the other members in that unit and each member will then to vote on whether the information should be promoted to the next layer.

The information that has the votes meeting or exceeding the passing rate (pre-set parameter) will be sent to the layer 1 subjects section 4310, and the participants 4201 who have recommended the contents during select/view function 4212 will automatically be invited into membership of layer 1 by the system. As members of layer 1 they are eligible to manage the layer 1 subjects, and will assume all the responsibilities, as well as the rights of layer 1 members. However, the invited participant may refuse to accept or may decline the membership invitation to layer 1 or any other layer.

The content that does not have votes meeting or exceeding the passing rate, will not be included in layer 1 subjects. However, if the content was recommended at the recommendation function 4217 and by at least one reviewing layer 1 member 4304 it will be assigned a DJ (see the DR Rank section below) ranking.

The leader elected 4308 by the layer 1 members will become a layer 2 member 4312. Therefore, the number of the members in layer 2 units 4314 is equal to the number of its direct subordinate layer 1 units.

The layer 2 members 4312 review the contents in layer 1 subjects 4310 that were recommended by the layer 1 units. The system distributes the contents in layer 1 subjects to the layer 2 members according to a predefined algorithm. In some embodiment, the algorithm is designed to similar random assignment. However, if the contents was assigned to one given layer 1 unit, the system will not assign that contents to a layer 2 member that is a member of the given layer 1 unit, where that contents was previously considered by that given layer 1 unit, to avoid prejudice. Each layer 2 members can further recommend the contents that he/she believes are of value during preliminary review at layer 2. Contents recommended by layer 2 members are the preliminary reviewed will then be presented by the system for a unit vote. If the votes of the members received meet or exceed the pre-set passing rate 4315, the contents will then be automatically sent to layer 2 subject area 4317.

The leader elected 4316 by the layer 2 members will become the members of the upper layer, namely here layer 3 members. The contents of layer 2 subjects area will be assessed by preliminary review and a unit vote will be conducted among the layer 3 members, if the votes of the layer 3 members meet or exceed the pre-set passing rate, the content will be escalated and become the layer 3 subjects. The dotted lines 4316 and 4322 represent the that there may be any number of intermediate layers (not shown) and subjects (not shown) towards the highest layer N units 4320 and its layer N subjects 4324. The rules at each layer are the same.

DR Rank

The aforementioned system and methods provide means to attract participants into SOC structure through which information can be filtered layer by layer from the bottom up, and the filtered information will be given a value according to the level it has reached. Different from filtering system through machine-only algorithm, DR ranking takes advantage of human knowledge and wisdom to enhance the quality of search 4413 results. It is hard to judge the quality of search results though the ranking generated by a computer algorithm. Taking advantage of human wisdom is way to enhance the search result with higher accuracy in terms of statistic significance that is achieved through participants input, as well, by the filtering power of the layered SOC structure. In some embodiments, the large scale participation of participants can distribute the work and further enhance the accuracy of the search results 4413.

SOC structure filters information in two ways: voting by members and decisions by the leader. DR ranks may be provided on information based on the filtering process. Under the voting by members process, members will receive distributed contents from the subordinating units, or from Internet user if the unit is on the base layer (see 4217), from which, members will preliminarily recommend the information he/she believes is of value. The recommended information will be reviewed by all the other members in the unit and the unit members will vote if the recommended contents is worthy of escalating to next higher level. Recursively, each layer follows the same rules to filter information. In some embodiments of the DR rank system, the system will increase the rank of contents by a value of 1 each time a unit votes to promote the contents. In some embodiments of the DR rank system, the system will increase the rank of contents by a value of 1 each time a member preliminarily recommends the contents and increase the rank of the contents by a value of 1 when a unit votes to promote the contents. In some embodiments, a different value is assigned to content receiving a preliminary recommendation than is assigned to content receiving a unit vote to promote, e.g. +1 for preliminary vote and +3 for a unit vote to promote.

Another method is "decision by leader" where members with receive distributed contents from the subordinating units, or from Internet user if the unit is on the base layer (see 4217) from which members will recommend information he/she believes is of value. The leader will select the ones from the recommended contents that he/she believes of value, and escalate them to the next higher level. Recursively, each layer follows the same rules to filter information.

Therefore, at least three types of value events may indicate the content is valuable and thus provide a basis for increasing the DR rank associated with the content, a preliminary recommendation by a member to promote the content, a unit vote of a unit to promote the content, a leader recommendation to promote the content.

In some embodiments the DR rank system, the system will increase the rank of contents by a value of 1 each time a leader promotes the contents. In some embodiments, a different value is assigned to content receiving a leader promotion recommendation than is assigned to content receiving a unit vote to promote, e.g. +1 for preliminary vote and +2 for a leader promotion recommendation. Other incremental values can be assigned each type of value event. In some embodiments, DR rank is the sum rank increases resulting from a preliminary recommendation, a unit vote to promote, and/or a leader promotion recommendation at any layer. In some embodiments, the DR rank of contents is only increase when the content is promoted by a unit vote to promote.

In general, the method "decision by leader" is more efficient than the method "voting by member", especially in initial phase of SOC structure implementation. Once the SOC structure becomes mature and members are active to certain extent, the method "voting by member" should be used as a regular operation as it embodies the SOC advantages, that is, the accuracy in terms of statistic significance through large scale of participation.

The data selected/filtered using "Self-Organization Information Process System" (FIG. 4)—including the data "Shared" 4208 or Selected/Viewed 4212 by all the participants, as well as the "Recommended" 4217 through the layers of SOC structures—are stored in the database 4215. The information in this database is hand-picked by individuals and reviewed/assessed by groups (units), hence is of higher quality compared with the enormous random Internet information; all the data collected in the database is given DR values using the methods mentioned above. When the data accumulate to certain extent, users can search by key words—searching results are ordered according to its DR value, or taking advantage of layered SOC structure that covers certain subjects by regions or fields, users can directly go to certain layer of SOC structure, review the information that is filtered to such extent namely, according to the associated DR value.

DR rank is an application of SOC structure, and DR value reflects the results of information filtering through SOC structure. The DR value pyramid represents the quality level of the information, is used to organize information from general to specific by regions or fields, and to provide the convenience to find the targeted information. In SOC structure, the information amount is further reduced and refined over the layers from bottom up which is the way to solve information overload and to enhance searching results. Therefore, DR rank can be used as a new searching method to complement the existing ones, and to mitigate their inefficiency.

Taking advantage of SOC open interface platform and sharable database, users can implement SOC structures (SOC structure can be merged or united) to filter/refine/categorize information by regions or fields. DR value is obtained for each piece of information along the process, and targeted information products are in the mean time generated—Scroll News 4405 in the order of DR value, various guides 4404, Audio/Video Channels 4407 and Data Warehouse 4408 etc. These products are the end results of massive participation of users, hence represent and address the needs of users.

SOwiki Methods

SOwiki system and methods are the same as SOC system and methods in terms of its structure and creation. The difference between SOwiki system and SOC system is that members in Sowiki system will also take part in editing and consolidating information in addition to reviewing or recommending information. Under one embodiment of the SOC system, the results consist of a listing of links or contents without any editorial commentary, whereas SOwiki system provides members the ability to reorganize and consolidate contents provide commentary. If the SOC system provides an ordered listing of content, the SOwiki system has the functionality of, in an analogy with the news industry, editorial control to consolidate, paraphrase, reorganize, and editorialize on information based on primary sources, or input from members. The steps are detailed in the following.

The pending layer 1 review contents 4301 by layer 1 units 4306 will be distributed automatically by the system among the unit members. Each member will consolidate the information assigned to him/her, and submit the result to the layer 1 subjects module 4310. Each member can create subjects, expand the scope of the existing subjects, or revisit the subjects already considered. However, all each members efforts of consolidating, creating, expanding, revisiting, etc., must be approved by the other members in his/her unit through voting in order to make them effective.

Hence, the contents of the layer 1 subjects are not composites of the recommended information listed in parallel, as in SOC system, instead, it is a whole piece consolidated by all the members in the unit.

The leader elected by the layer 1 members will become a layer 2 member 4312 of a layer 2 unit 4314, bringing the consolidated and voting approved layer 1 subjects 4310 into the layer 2, which if approved by the layer 2 members will become layer 2 subjects 4317, and the leader will participate in further consolidation of the layer 2 subjects representing the unit from which he/she is elected.

A layer 2 subject is comprised of a number of the layer 1 subjects. Each layer 2 member is also the leader of a layer 1 unit, and he/she is not only working on the subject from his original layer 1 unit, but also the subjects from other members in the layer 2 unit. All the members work on the subjects has to be approved by the majority of the members in the corresponding unit through voting.

Dotted lines 4316, 4322 represent multiple intermediate layers (not shown) and subjects (not shown) towards the highest layer N units and layer N subjects. Each layer follows the same rules.

Information Products

The consolidated results at each layer through SOwiki structure all possess a certain value to the targeted groups of users. For instance, the news category at each level and sub category area (i.e. communities to town, city, global) are of a value to the users that are covered by this layer or area; in the professional fields, the contents at each layer and field are of value to the users in the targeted field, Therefore, newspapers series that cover different areas, fields or levels 4403 can be produced naturally from the bottom to up.

The information that is filtered from Internet sources, such as Facebook or Twitter, using SOC methods may be presented in the form of news scroll 4405, and distributed at any time through wireless network, mobiles etc, hence becoming the new media to satisfy the needs of community communication, city life, public entertainment, and the like.

Automatic searching is mainly conducted based on letters or characters by machine which is very limited in terms of assessing and ranking audio/video program where the use of human intelligence has preponderant advantage. In addition, the selected programs can be edited or consolidated using SOwiki methods and presented/distributed in the forms of various web "Audio/Video" stations 4407.

Assessing and filtering the information that are provided by participants 4201, SOwiki members (acting as editors) can obtain accurate, comprehensive, up-to-date information and create various guides 4404 to satisfy the needs of users in various fields (traveling, medical insurance, consumer reports, interests, etc.).

The attributes that SOC-SOwiki methods to consolidate information from different branches layer by layer, will attract many users to collaborate in a structured way for collaborative projects 4406 such as surveys, subject study, collective writing, magazine editing, translation, etc.

The final products will be distributed through SOC-SOwiki Platform 4410 so that network, users, such as Internet users 4411 can take advantage of its information to create various business models.

Technical Support

The SOIPS has a number of administrative functions. The products (or the extension of the products) created by the members of SOC-SOwiki will be credited by the module of "Credit Points Management System" 4501 (crediting algorithm is predefined and agreed by SOC-SOwiki). The Financial System 4503 will distribute the revenue among members based on the credit points they contribute.

Because a user can join multiple structures with different subjects, or be selected as a leader of any units that might not be at the same level, 4502 is a powerful ID management System to manage the complex member IDs and the permissions related the user's ID and corresponding access level.

The Self-Organization Information Process System is a platform which supports SOC-Sowiki structures to process information independently and respectively in order to create their own information products 4402. However the database tools 4504 allow the database to be sharable to make structure reorganization or transition easy.

Functionalities of SOC and SOwiki System

The FIG. 5 demonstrates the functionalities of SOC and Sowiki System. The platform supports all the functions needed to create/operate SOC applications (covered in the dashed-line frame 5300 and as well as SOwiki applications (covered in the solid line frame 5400). Functions of SOC system are the subset of SOwiki system.

Members of SOC or SOwiki structures come from network users, such as Internet users 5200. The sources of information 5100 are either created or collected from the network, such as the Internet by members. Various applications/products 5780 can be created/implemented by taking advantage of SOC or SOwiki functions.

SOC 5300

A member management module 5310 provides the functions for users to grow SOC by recruiting people from outside through its lowest/base level by invitation or self-introduction. A voting process will be prompted for the unit that prospective member is intended to join, and the prospective member will become member officially and assume all the responsibilities and rights if the majority of the unit vote in favor of the prospective member joining the unit. The module also provides the function to develop restrictions over memberships in addition to regular membership management.

A system set-up module 5303 provides the functions to set system parameters. A series of parameters need to be taken into consideration to start a system. The system set-up module provides default values, but founders/initiators of SOC or SOwiki structure have the option to either use default values or to provide values they prefer. It also provides tools and processes for members to determine/reset parameter values at any phase. Whenever there is a proposal to reset parameter(s) and the required motion second minimum number of members seconds the motion to change given parameters, the system will prompt a voting process. The parameter(s) will be reset if certain percentage (default value: ½) of all the members, and of the leaders (default value: ⅔) at the highest layer vote in favor.

An election module 5302 provides the functions for members to elect leaders. Progressing from bottom up, each unit elects its leader by voting. That elected leader is then a member of the next immediately higher layer. Any member can propose a motion for re-election of its unit leader at any time, and responsibilities and rights of the position will be automatically transferred from the old leader, if the old leader loses the election, to the newly leader-elect if a majority (or a value as pre-defined) vote in favor of the new leader.

A unit splitting module 5304 provides functions to split a unit when the unit reaches ñ (maximum size of a unit, a parameter defined in system set-up), a splitting process will be prompted by the system. If there is upper layer on top, the unit will split into no less than n (the minimum size of a unit, a parameter defined in system set-up) new units, each of which should have no less than n members.

A layer growing module 5305 provides functions to grow layers of SOC and SOwiki structures. When a unit reaches ñ (maximum size of a unit, a parameter defined in system set-up), it will be spilt into at least n̠ (the minimum size of a unit, a parameter defined in system set-up) new units. The elected leaders of each of the new units then form a new unit of a higher level, and hence a new layer, if it does not already exist. The units at higher level can grow new layers from up and down as well as shown in FIG. 2.

A voting module 5306 provides functions for members to cast votes. Voting can be conducted within a unit, or as referendum within a branch or whole system/structure for the purpose of decision making on various matters. The weighted votes are automatically calculated, and the results are the keys to automatically turn on/off related rights that result from the election.

A blog module 5307 creates and provides functionality to each blog of the system. Each member is provided with personal blog and the opinions or activities of this person are presented and recorded in this blog. Each leader is equipped with position blog and the opinions or activities related to this position are presented and recorded in this blog.

A forum module 5308 creates and provides functionality to each forum of the system. Each unit is provided with internal forum for unit members to deal with internal affairs through discussion or decision making (voting or electing); each branch is provided with internal forum for its members to submit/view inputs and provide feedbacks, and as well, to conduct referendum within it.

A reorganization module 5309 provides the functions to create dynamic and rich forms of SOC structures through unit or branch transferring, merging, seceding or affiliating within same structure or among different structures.

Sowiki 5400

A member management nodule 5401 provides functions to support Sowiki's methods of absorbing new members. Sowiki absorbs new members mainly through self-introduction by way of a prospective member's participation by providing inputs through Wiki at the base layer, and will then become member if the majority of the members of the unit that the prospective member is intended to join vote in favor for the inputs/content submitted by the prospective member. The members who have been inactive for predetermined time will be categorized as inactive member and won't be included in the calculation of vote weight.

A wiki module 5402 provides the functions for members to create, provide, or revise information in the system.

A wiki consolidation module 5403 provides functionality to review and consolidate contents based on voting. Content that is created, provided, or updated is provisionally stored pending for review. The content will become effective or not according to the voting of the unit that the contents belong to.

A unit creation module 5404 provides the functions for members to create subordinate new unit, and supports the methods of unit management. For example a new unit will not be eligible to vote if the number of its members is less then n̠ (the minimum size of a unit, a parameter defined in system set-up). The unit's right of voting will be surrogated by its upper unit and be restituted to the unit once the number of the members reaches ≥n̠.

A content re-organization module 5405 provides functions to support SOC structure re-organization, this module provides the functions for members, using Sowiki methods, to reorganize the Sowiki structures as well as the contents resulting from such restructure.

One or more application program interfaces (APIs) 5601 and 5602 may be provided. The APIs allow user to implement their own programs to be used in the SOC-SOwiki platform or in conjunction therewith.

It will be understood that the structures and information presented above may be saved in computer database in any format known in the art. In some embodiments, each unit of the structure has unit record 6640 stored in a computer datastore, such as a database. The unit record or structure has a unit ID section 6641, a superior unit section 6642, a leader section 6644, a project(s) section 6644, and a history section 6645. The unit ID section contains a unique unit identifier. The superior unit section 6642 contains the unit ID which the unit is subordinate to in the next immediately higher layer. The leader section 6643 contains the name or unique identifier of the member that is the leader of that unit. The project(s) section 6644 contains one or more projects or goals of the unit. The history section 6645 contains a transaction history of events occurring in the unit, such a votes on leadership of the unit, votes on any topic in the unit, the joining of members to the unit, the exiting of members from the group, information on whether results or content submitted by the unit to superior unit was accepted or rejected, or the like.

One skilled in the art will recognize that not every section of the unit record 6640 is necessary to implement the invention. For example, in some embodiments, the hierarchal structure of the SOC or the SoWiki is represented in a relationship table 6630. As shown in FIG. 6, the table has a unit column 6631 and a superior unit column 6632. Therefore, for each unit in the unit column, that unit's immediately superior unit is recorded in the superior unit column of that row. The example shown in FIG. 6 provides that a first layer having units 1, 3, 4, 5, 8, 9, 11, 12, 13, and 14, a second layer having units 2, 6, and 10, and a third layer having unit 7. Units 1, 3 and 8 in the first layer are subordinate to unit 2 in the second layer; units 4, 5, 9, and 11 are subordinate to unit 6 in the second layer; and units 12, 13, and 14 are subordinate to unit 10 in the second layer. Units 2, 6, and 10 in the second layer are subordinate to unit 7 in the third layer. The value 0 in column 6632 across from unit 7 indicates unit 7 is presently in the top layer with no other units superior to it. Other values can be provided to show a top layer unit. Units 1, 2, 3, 7, and 8 comprise one branch of the structure. Units 4, 5, 6, 7, and 9 comprise a second branch of the structure. Units 10, 12, 13, 14, and 7 comprise a third branch of the structure. Other sub-branches can be described from this structure and others. Therefore the structure of the SOC and the SoWiki can be represented in a flat relationship table. Other associations between units can also be shown in a table in a similar manner, such as an affiliation between units as explained about with reference to FIG. 3. In other embodiments, the SOC and SoWiki structure is represented by other relationship recording structures in a computer datastore, such as a database, flat file, or other computer data structures known in the art.

In some embodiments, each member of any unit of the structure has member record 6610 stored in a computer datastore, such as a database. The member record 6610 has a record ID section 6611, a member name section 6612, a password section 6613, a unit membership 6614 section, and a leadership section 6615. The record ID section 6611 contains a unique user record ID value. The member name section contains the member's user name. In some embodiments, all member user names are unique, in which case the record ID section is not used and instead the member name section is relied on for identification. The password section contains authentication information such as a password. The unit membership section contains information about which units the member has a membership in. The leadership section contains information about which units that a member is a leader of.

One skilled in the art will recognize that not every section of the unit record 6640 is necessary to implement the invention. For example, in some embodiments, a members unit membership information is represented in a user table 7650. Member ID's are listed in the member ID column 7650 for each member of the SOC or SoWiki structure. In unit column 7652 each unit of which the member has membership in is listed. In leader column 7653 each unit that the member is a leader of is listed. Therefore member ID 00002 is a member of units 2 and 7 and is a leader of unit 2.

The forgoing SOC, SoWiki, and SOIPS and any step, function, module, or method described above may be implemented as instructions on a programmable general computer, or across multiple computers, capable of carrying out the instructions to achieve the step, function, module, method, or result indicated. In some embodiments, the general purpose computer has a processor signal connected to a memory, an input/output device, and a network adapter. The general purpose computer may be a service connected to a database. The general purpose computer may be accessible over a network, such as the Internet.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A computer implemented method of creating a self-governing democratic tree structure in a computer readable storage memory for completing a project, comprising the steps of:

forming a plurality of units in the computer-readable memory of a computer system, each of the plurality of units is associated with a unit minimum number of member IDs corresponding to a unit minimum number of human members, each human member is associated with a corresponding member ID stored on the computer-readable memory, the unit minimum number of human members being at least three members, each of the plurality of units comprising a unit project wherein one or more unit project deliverables are accepted by the unit when a pass number of human members of the unit approve, by an electronic vote of the human members of the unit, the one or more unit project deliverables;

prompting electronically an election in one or more of the plurality of units, by an electronic vote of human members of the corresponding unit, of one human member of the corresponding unit as a human leader for corresponding unit;

promoting electronically the human leader of one or more units of the plurality of units to membership in a superior unit of the plurality of units in a next layer of the democratic tree structure above the corresponding unit from which the leader is promoted; by associating the member ID of leader with the superior unit;

receiving one or more new members in a unit of the plurality of units in a base layer of the democratic tree structure when an electronic membership vote of human members of the unit approve granting membership in the unit to the one or more new members, the one or more new members who were not previously a member of any unit of the plurality of units are only initially admitted into membership of units in the base layer; and, repeating at least the steps of forming, prompting, and promoting in each successive layer of a plurality of layers of the democratic tree structure above the base layer and below a top layer, each layer below the top layer of the plurality of layers comprising three or more units of the plurality of units, each unit above a base layer of the plurality of layers is a receiving superior unit for receiving one or more project deliverables from at least three inferior sending units of the plurality of units in a next lower layer of the plurality of layers, each unit below the top layer provides deliverables to only one receiving superior unit in a next higher layer of the plurality of layers, the plurality of layers comprises at least three layers;

the step of forming comprises the step of splitting a unit of the plurality of units into a plurality of resulting units when the unit is associated with a number of member IDs corresponding to human members that is greater than a predefined maximum unit size;

the step of splitting comprises the step of forcing a reorganization of membership between resulting units if any of the resulting units fail to be associated with a resulting number of member IDs, corresponding to human members, of at least the unit minimum number of human members;

the step of splitting further comprises the step of splitting the unit into at least a number of units equal to the unit minimum number of human members when no layer exists above the unit being split;

the step of receiving one or more new members comprises the step of sending an electronic invitation inviting a potential human member into membership in a unit, of the plurality of units, in the base layer when the unit accepts a submission by the potential human member into the unit project of the unit by an electronic vote of the human members of the unit;

the step of prompting an election comprises the step of weighting a vote of each voting human member of units above the base layer, wherein a vote weight of the vote of each voting human member is equal to a number of human members in a branch of the democratic tree structure underneath the unit from which the human member is elected as the leader;

transferring a portion of the structure from a first node to a second node of the structure when an application by the first node receives a transfer minimum number of votes, during an electronic vote, from members of a senior unit of the second node, the first node is a first branch of the structure or is one of the plurality of units of the structure, and the second node is a second branch of the structure; and, merging a portion of the structure from a third node into a fourth node of the structure, when an application by the third node receives a merger minimum number of votes, during an electronic vote, from members of a senior unit of the fourth node, the third node is one of said plurality of units or is a third branch of the structure, and the fourth node is one of said plurality of units or is a fourth branch of the structure;

seceding a fifth node from the structure to an independent self-governing democratic tree structure in the computer-readable memory when a predefined seceding number of members of the fifth node vote, during an electronic vote, to secede, the fifth node comprising one or more units of the plurality of units;

affiliating two or more units of the plurality of units wherein leaders from affiliating units become members of a resulting affiliate unit.

2. The method of claim 1, wherein the step of forming comprises the step of:
determining the unit project for an inceptive unit of the plurality of units by an electronic vote of its human members after the unit minimum number of human members are gathered to form the inceptive unit.

3. The method of claim 2, wherein the step of splitting comprises the steps of:
dissolving the inceptive unit; and
allowing human members of the inceptive unit to join resulting units, by associating the human member's member ID with one of the resulting units, from the split as long as each unit resulting from the split is associated with at least the unit minimum number of human members.

4. The method of claim 1, comprising the step of recording actions of each of the plurality of units in the computer-readable memory.

5. The method of claim 1, comprising the step of:
providing each human member with a personal blog stored on the computer readable memory and recording on the personal blog information posted by the human member to the personal blog.

6. The method of claim 1, comprising the step implementing by the leader, one or more decisions of one of the corresponding unit.

7. The method of claim 1, comprising the step of making an action of the leader of each unit of an upper layer viable by members of units of lower layers of the plurality of layers.

8. The method of claim 1, comprising the step of providing a leader blog stored on the computer-readable memory associated with each leader position and recording information posted by the leader on the leader blog.

9. The method of claim 1, comprising the step of providing a unit forum stored on the computer-readable memory associated with each unit of the plurality of units, wherein only human members comprising a member ID associated with the corresponding unit are permitted to write information on the unit forum.

10. A computer system, comprising:
a processor;
a memory in signal communication with the processor, the memory comprising a plurality of member IDs, each member ID associated with a human member;
a network interface in signal communication with the processor;
a hierarchal tree in the memory;
a hierarchal tree forming function stored on the memory and executable by the processor to form a hierarchal tree of units represented in the memory, the hierarchal tree comprising a plurality of layers and a plurality of units on each layer below a top layer of the plurality of layers; each unit below the top layer comprises only one immediately superior unit; each unit above a base layer of the plurality of layers comprises at least three immediately subordinate units; each unit is associated with a unit minimum number of member IDs corresponding to a unit minimum number of human members, the unit minimum number of human members being at least three members, each unit comprising a unit project wherein one or more unit project deliverables are accepted by the unit when a pass number of human members associated with the unit approve, by an electronic vote, the one or more unit project deliverables; each unit above the base layer of the plurality of layers is a receiving superior unit for receiving project deliverables from at least three inferior sending units of the plurality of units in a next lower layer of the plurality of layers;
an election prompting function stored on the memory and executable by the processor to electronically prompt an election in each unit, by vote of human members of the unit conducted via a computer network, of one member of the unit as a leader of the unit;
a leader promotion function stored on the memory and executable by the processor to promote electronically the leader of each unit to membership in a superior unit of the plurality of units in the next layer above a current layer the plurality of units comprising the corresponding unit from which the leader is promoted when the current layer has at least a predefined minimum number of units; and
a deliverable submission function stored on the memory and executable by the processor to submit, electronically, unit project deliverables of each unit to the corresponding unit's receiving superior unit when the receiving superior unit exists in the memory;
a unit splitting function stored on the memory and executable by the processor to split a unit of the plurality of units into a plurality of resulting units when the unit is associated with a number of member IDs corresponding to human members that is greater than a predefined maximum unit size;
a reorganization function stored on the memory and executable by the processor to force a reorganization of membership between resulting units if any of the resulting units fail to be associated with a resulting number of member IDs, corresponding to human members, of at least the unit minimum number of human members;
the unit splitting function comprises a minimum split function stored on the memory and executable by the processor to split the unit into at least a number of units equal to the unit minimum number of human members when no layer exists above the unit being split;
an invitation function stored on the memory and executable by the processor to send an electronic invitation inviting a potential human member into membership in the unit, of the plurality of units, in the base layer when the unit accepts a submission by the potential human member into the unit project of the unit by an electronic vote of the human members of the unit;
a vote weight function stored on the memory and executable by the processor to weight a vote of each voting human member in units above the base layer, wherein a vote weight of the vote of each voting human member is equal to a number of human members in a branch of the tree underneath the unit from which the human member is elected as the leader;
a transfer function stored on the memory and executable by the processor to transfer a portion of the tree from a first node to a second node of the tree when an application by the first node receives a transfer minimum number of votes, during an electronic vote, from members of a senior unit of the second node, the first node is a branch of the tree or is one of the plurality of units of the tree, and the second node is a branch of the tree;
a merge function stored on the memory and executable by the processor to merge a portion of the tree from a third node into a fourth node of the tree, when an application by the third node receives a merger minimum number of votes, during an electronic vote, from members of a senior unit of the fourth node, the third node is one of said plurality of units or is a third branch of the tree, and the fourth node is one of said plurality of units or a fourth branch of the tree;

a secession function stored on the memory and executable by the processor to secede a fifth node from the tree to an independent hierarchal tree in the computer readable storage memory when a predefined seceding number of members of the fifth node vote, during an electronic vote, to secede, the fifth node comprising one or more units of the plurality of units; and, an affiliating function stored on the memory and executable by the processor to affiliate two or more units, of the plurality of units, wherein leaders from affiliating units become members of a resulting affiliate unit.

11. The computer system of claim 10, comprising a recording function stored on the memory and executable by the processor to record action of each of the plurality of units on the memory.

12. The computer system of claim 10, comprising a personal blog function stored on the memory and executable by the processor to provide a personal blog to member and to record information posted by the corresponding member to the corresponding member blog.

13. The computer system of claim 10, comprising a leader blog function stored on the memory and executable by the processor to provide a leader blog to each leader and to record information posted by the corresponding leader to the corresponding leader blog.

14. The computer system of claim 10, comprising a unit forum function stored on the memory and executable by the processor to a unit forum for each unit of the plurality of units wherein only human members comprising member IDs associated with the corresponding unit are permitted to write information on the corresponding unit forum.

15. A computer-readable memory encoded with a computer program comprising instructions that, when executed, operate to cause a computer to perform operations comprising:

forming a hierarchal tree of units represented in the computer-readable memory, the tree comprising a plurality of layers and a plurality of units on each layer below a top layer; each unit below the top layer comprises only one an immediately superior unit; each unit above a base layer comprises at least three immediately subordinate units; each unit comprising a project wherein one or more unit project deliverables are accepted by the unit when a pass number of members of the unit approve the one or more unit project deliverables; each unit is associated with a unit minimum number of member IDs corresponding to a unit minimum number of human members, each human member is associated with a corresponding member ID stored on memory;

prompting an electronic election in each unit via a computer network, by vote of human members of the unit, one member of the unit as a leader for the unit;

promoting the leader of each unit to membership in a superior unit in a next layer above the layer in the computer-readable memory when the layer comprises at least a predefined minimum number of units;

repeating the steps of forming, prompting, and promoting in each successive layer of the tree above the base layer so that each unit above the base layer of the plurality of layers is a receiving superior unit for receiving project deliverables from at least three inferior sending units of the plurality of units in a next lower layer of the plurality of layers;

the step of forming comprises the step of splitting a unit of the plurality of units into a plurality of resulting units when the unit is associated with a number of member IDs corresponding to human members that is greater than a predefined maximum unit size;

the step of splitting comprises the step of forcing a reorganization of membership between resulting units if any resulting units fail to be associated with a resulting number of member IDs, corresponding to human members, of at least the unit minimum number of human members;

the step of splitting further comprises the step of splitting the unit into at least a number of units equal to the unit minimum number of human members when no layer exists above the unit being split;

the step of receiving one or more new members comprises the step of sending an electronic invitation inviting a potential human member into membership in a unit, of the plurality of units, in the base layer when the unit accepts a submission by the potential human member into the unit project of the unit by an electronic vote of the human members of the unit;

the step of prompting an electronic election comprises the step of weighting a vote of each voting human member in units above the base layer, wherein a vote weight of the vote of each voting human member is equal to a number of human members in a branch of the tree underneath the unit from which the human member is elected as the leader;

transferring a portion of the tree from a first node to a second node of the tree when an application by the first node receives a transfer minimum number of votes, during an electronic vote, from members of a senior unit of the second node, the first node is a branch of the tree or is one of the plurality of units of the tree, and the second node is a branch of the tree; and, merging a portion of the tree from a third node into a fourth node of the tree, when an application by the third node receives a merger minimum number of votes, during an electronic vote, from members of a senior unit of the fourth node, the third node is one of said plurality of units or is a third branch of the tree, and the fourth node is one of said plurality of units or a fourth branch of the tree;

seceding a fifth node from the tree to an independent self-governing democratic tree tree in the computer readable storage memory when a predefined seceding number of members of the fifth node vote, during an electronic vote, to secede, the fifth node comprising one or more units of the plurality of units;

affiliating two or more units of the plurality of units wherein leaders from affiliating units become members of a resulting affiliate unit.

* * * * *